United States Patent [19]

Zimmer

[11] 4,146,877

[45] Mar. 27, 1979

[54] CHARACTER GENERATOR FOR VIDEO DISPLAY

[76] Inventor: Edward F. Zimmer, 6107 Jackson Rd., Ann Arbor, Mich. 48103

[21] Appl. No.: 800,626

[22] Filed: May 26, 1977

[51] Int. Cl.[2] .............................................. G06K 15/20

[52] U.S. Cl. ..................................... 340/750; 340/723

[58] Field of Search ................................. 340/324 AD

[56] References Cited

U.S. PATENT DOCUMENTS

| | | | |
|---|---|---|---|
| 3,868,672 | 2/1975 | Johnson | 340/324 AD |
| 3,877,007 | 4/1975 | Fishman | 340/324 AD |
| 3,918,040 | 11/1975 | Beuter et al. | 340/324 AD |
| 3,952,296 | 4/1976 | Bates | 340/324 AD |
| 3,976,990 | 8/1976 | Haak | 340/324 AD |

*Primary Examiner*—David L. Trafton

*Attorney, Agent, or Firm*—Krass & Young

[57] ABSTRACT

A video display device generates a plurality of character rows having a total height of ten lines containing a plurality of characters constructed of a seven dot wide, eight dot high matrix. A read-only memory for the character generator stores eight-bit signals for each character. The ROM receives a signal from a line-within-a-row counter and the least three significant bits of a four-bit character code to output the pertinent eight-bit signal. Seven bits of the signal are provided in parallel to a parallel/serial converter which causes them to be outputted to the video display sequentially as the dot time signal changes. The eighth bit of the code as well as the most significant bit of the character code are provided to a logic circuit which clears the parallel/-serial converter during the generation of two of the ten lines of a row. The remaining eight matrix lines are accordingly selectively positioned within the ten of the row height allowing clearance between the descenders of the lower case letters and the tops of the upper case letters on the next succeeding row.

14 Claims, 3 Drawing Figures

Figure 1:
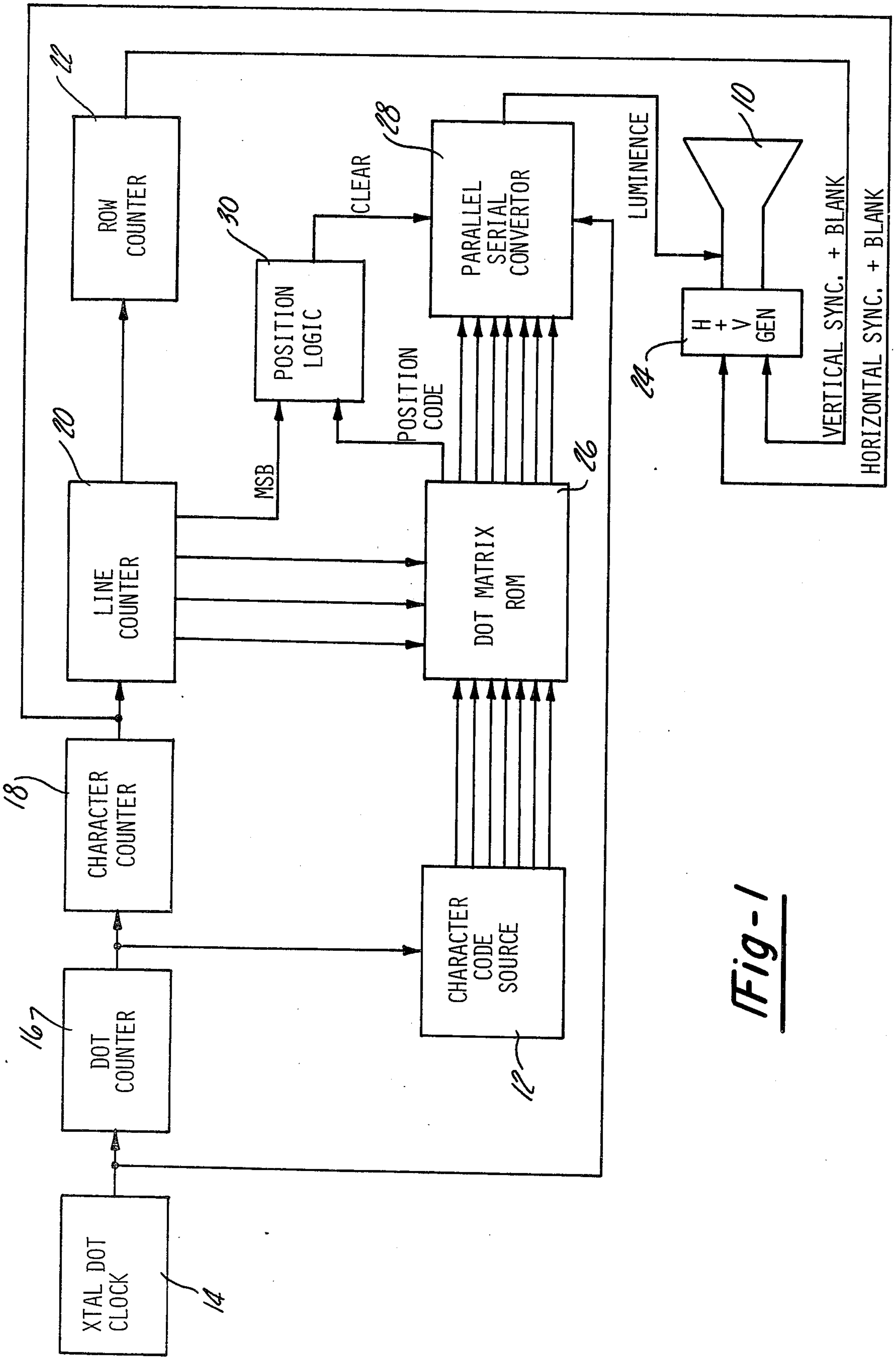

| LINE COUNTER | ROM MATRIX OUTPUT | POSITION CODE | POSITION LOGIC OUTPUT |
|---|---|---|---|
| 0 0 0 0 | 1 1 1 1 1 1 1 | 1 | 1 |
| 0 0 0 1 | 0 0 0 1 0 0 0 | 1 | 1 |
| 0 0 1 0 | 0 0 0 1 0 0 0 | 1 | 1 |
| 0 0 1 1 | 0 0 0 1 0 0 0 | 1 | 1 |
| 0 1 0 0 | 0 0 0 1 0 0 0 | 1 | 1 |
| 0 1 0 1 | 0 0 0 1 0 0 0 | 1 | 1 |
| 0 1 1 0 | 0 0 0 1 0 0 0 | 1 | 1 |
| 0 1 1 1 | 0 0 0 1 0 0 0 | 1 | 1 |
| 1 0 0 0 | 1 1 1 1 1 1 1 | 1 | 0 |
| 1 0 0 1 | 0 0 0 1 0 0 0 | 1 | 0 |

VIDEO OUTPUT

| LINE COUNTER | ROM MATRIX OUTPUT | POSITION CODE | POSITION LOGIC OUTPUT |
|---|---|---|---|
| 0 0 0 0 | 1 0 0 0 1 0 0 | 0 | 0 |
| 0 0 0 1 | 0 1 1 1 0 0 0 | 0 | 0 |
| 0 0 1 0 | 0 0 0 0 0 0 0 | 1 | 1 |
| 0 0 1 1 | 0 1 1 1 1 0 0 | 1 | 1 |
| 0 1 0 0 | 1 0 0 0 1 0 0 | 1 | 1 |
| 0 1 0 1 | 1 0 0 0 1 0 0 | 1 | 1 |
| 0 1 1 0 | 0 1 1 1 1 0 0 | 1 | 1 |
| 0 1 1 1 | 0 0 0 0 1 0 0 | 1 | 1 |
| 1 0 0 0 | 1 0 0 0 1 0 0 | 0 | 1 |
| 1 0 0 1 | 0 1 1 1 0 0 0 | 0 | 1 |

VIDEO OUTPUT

CHARACTER GENERATOR FOR VIDEO DISPLAY

BACKGROUND OF THE INVENTION

1. Field of the Invention

This invention relates to a video character display system and more particularly to a dot matrix character generator capable of selectively positioning a plurality of lines of matrix dots within a row containing a larger number of lines.

2. Prior Art

A common method of generating a plurality of characters such as alpha-numerics, punctuation symbols, and special code symbols on a display device such as a cathode ray tube involves formation of the characters as a rectangular matrix of dots; selective dots within the matrix are energized or illuminated to generate the desired character. A row of these characters are generated across the width of a CRT screen by scanning the screen horizontally a number of times, with successive downward vertical displacements between each line. To generate a full row a number of lines equal to the number of vertical elements in the matrix are generated. During each horizontal scan the luminence of the cathode ray beam is modulated, i.e. the beam is turned on and off, in accordance with the dots in the particular line of the matrix pattern being scanned.

With a five by seven matrix, which is commonly employed in low definition applications, each character is specified by 35 points and 35 bits of information, seven lines of five bits each, are used to define the matrix. The character to be displayed at any instant is defined by a short binary code which specifies the character type but not the matrix. In a system in which 128 different characters may be displayed a seven bit code is employed. The code for a particular character to be displayed is applied to a memory which stores the dot matrix for each of the characters. Typically the memory also receives the number of the line in the matrix which is being generated and outputs a five-bit signal representative of the five dots in the matrix for the particular line of the defined character.

With these dot matrix systems a problem is created by the fact that certain of the lower case letters, typically j, p and q have sections which descend below the normal bottom margin of the row. If the two bottom lines of the matrix are used solely for the display of these descenders the remaining letters are cramped. Type styles which do not include the descenders are difficult to read. If the matrix is enlarged to say $5 \times 9$ or $5 \times 10$ in order to accommodate these descenders the size and cost of the character code matrix memory is substantially increased. For example, a $5 \times 7$ matrix for 128 characters requires about 5,000 bits while a $5 \times 10$ matrix would require about 10,000 bits, doubling the cost of the memory.

SUMMARY OF THE INVENTION

The present invention is directed toward a dot matrix character generator system for a video display which solves the problem of displaying the descenders of lower case letters without requiring a ROM that stores the matrix information for each horizontal line required to form a row. Broadly, the present invention includes a ROM that stores a number of dot matrix lines for each character which is less than the number of lines required to generate a row and a position code is stored with the matrix code which enables the system to distribute the stored lines among the larger number of generated lines to create the required character. In dealing with the problem of the lower case descenders, the system generates these lower case letters so that they fill the bottom of the character space within the row and other characters are generated so that they fill the top space. The matrix memory for the system is not much larger than the memory required for a much smaller matrix size.

In a preferred embodiment of the system, which will subsequently be described in detail, the memory takes the form of a ROM which stores a seven wide by eight high dot matrix for each character but each character is displayed within a ten line high row. The eight lines stored in the matrix are distributed within the ten lines of each character display in such a manner as to generate the required character. The eight matrix lines which define the lower case letters with descenders are displayed as the bottom eight lines of the ten line character space and the two upper lines are blanked. The eight matrix lines for most of the other characters occupy the eight top lines of the row and the bottom two lines are blanked, although the system permits the blanked lines to be distributed anywhere within the row height.

In the preferred embodiment this distribution is achieved by causing the ROM to output two of the matrix lines twice during the generation of the ten lines of the row and providing control means which inhibits the application of the output of the ROM to the display device during the generation of two lines, so that each of the eight line codes stored in the ROM for a character are displayed once during the generation of a row incorporating that character and the other two lines of the row are blanked.

In the preferred embodiment the ROM stores eight bits of information for each of the eight matrix lines of a character. Seven of the bits represent the video status of the seven dot points in a line across the width of the character and are provided to the video display in sequence from a parallel/serial converter, under control of a dot timing clock. The eighth bit stored with each line in the matrix is provided to a logic circuit that also receives the highest order bit of the four bits that define the vertical line position within the row. These two input signals cause the logic unit to generate signals occuring in timed relation to the output of two of the matrix line from the ROM which cause a blanked output to the video display device during the times those lines would otherwise be generated.

The three least significant bits of the line count signal are applied to the ROM along with a seven bit character signal defining which of the characters stored within the ROM is to be displayed. During the generation of the ten lines that define a row the three least significant bits of the line count signal repeat themself twice; the three bits only define eight unique states and during the last two lines these bits assume the same two states as they did during the generation of the first two lines. In the preferred embodiment the eighth bit stored with each of the matrix lines indicates to the logic unit whether the character to be generated is to occupy the eight top lines of the row space, in which case the last two outputs from the ROM are blanked, or whether it is to occupy the bottom eight spaces, in which case the output of the ROM during the generation of the first two lines are blanked. Thereby each of the eight stored matrix lines are displayed once in the generation of a row and then are distributed over the larger number of lines within the row under control of the ROM stored position control signals.

In alternative embodiments of the invention it would not be necessary to cluster all of the lines to be generated at either the top or the bottom of the row height. For example, with a system that had a 16 line row height and stored eight matrix lines in the ROM for each character, the eight lines could be distributed on alternate row lines for certain characters, in the eight top lines of the row space for other characters, and the eight bottom lines of the row space for still other characters. Essentially, the invention contemplates a system in which M lines are available in a row for the generation of each character and the dot matrix for each character is only defined by N rows, where M is greater than N, and the N lines of the matrix are distributed among the M lines of a row based on position control signals stored in the matrix and outputted with the matrix information for the character.

Other objectives, advantages and applications of the invention will be made apparent by the following detailed description of a preferred embodiment of the invention.

Figure 2A:
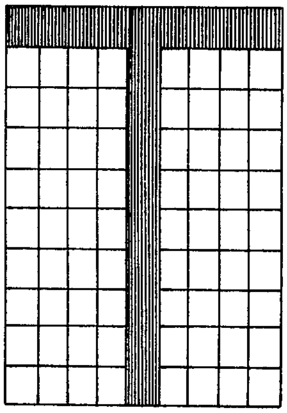
Figure 2B:
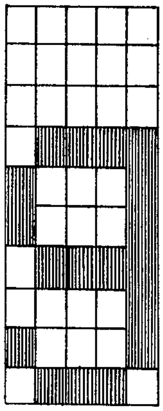

The invention makes reference to the accompanying drawings in which:

FIG. 1 is a block diagram of a video display system employing a dot matrix character generator formed in accordance with the present invention;

FIG. 2*a* is a graphic representation of a line counter output, the ROM output, the position logic circuit output, and the video output for generation of a capital letter "T"; and FIG. 2*b* is the same representation of a lower case letter "g".

Referring to FIG. 1, a dot matrix character generator is used with a cathode ray tube display 10. Alternative embodiments of the invention might use other forms of the display such as plasma display tubes and the like.

Seven bit parallel character codes defining which one of the 128 possible characters is to be instantaneously displayed on the CRT 10 are generated by a source 12. The source is typically some form of computer based display processor associated with a computer system or terminal or the like. The source 12 sequentially provides character codes representative of each of the characters to be displayed in a row across the width of the CRT screen in timed relation with the generation of a single horizontal line across the screen. The same sequence of characters is repeatedly outputted by the source 12 during the generation of the next nine lines which complete the ten line row.

The basic timing for the system is derived from a dot clock 14 preferably employing a crystal oscillator or a similar highly stable time base. The clock 14 generates a binary valued signal which changes state at a rate defining the distance between two sequential dot elements to be generated on the screen of the CRT 10. This dot signal is provided to a dot counter 16 which counts the seven dots which define the width of a character matrix plus an eighth dot representing the inter-character spacing. Thus the dot counter 16 generates a bi-valued output defining a single character width time.

The output signals from the dot counter 16 are provided to a character counter 18 which counts the number of characters contained in a horizontal row across the width of the CRT screen. The outputs of the character counter 18 thus define the length of a line and are provided to a line counter 20 which counts the number of lines contained in one row of characters. In the preferred embodiment of the invention a character is eight lines high and those eight lines of the matrix are distributed within ten horizontal lines. The vertical intercharacter spacing may consist of another four lines so that the total row to row spacing is 14 lines. The line counter 20 generates a four bit parallel signal encoding the line number within the row. Each time a full count of 14 is reached an output is provided to a row counter 22 and the line counter 20 is cleared.

The row counter 22 counts the number of rows which constitute a full screen height. After completion of a full screen the counter generates a vertical synchronization and blanking signal which is provided to a horizontal and vertical scan generator 24 associated with the cathode ray tube 10.

Similarly, the horizontal synchronization and blank signals to the generator 24 are derived from the output of the character counter 18. These signals cause the beam of the cathode ray tube 10 to scan the tube in a rectangular raster in timed relation to the generation of the signals to the clock 14 and the counters 16, 18, 20 and 22.

The output of the dot counters 16, defining the width of a single character, is provided to the character code source 12 and causes it to synchronize the output of character codes with the scan of the cathode ray tube.

The character code signals from the source 12 as well as the three least significant bits of the count contained within the line counter 20 are provided to a dot matrix read-only memory 26. This memory stores eight eight-bit line words for each character within the system's capability. Since a seven-bit character code is employed, the ROM 26 may store an 8 × 8 matrix for each of up to 128 characters.

Each eight-bit line word includes seven bits representative of the dot conditions along one horizontal line of the particular character matrix and an eighth bit constituting a position code. The ROM 26 may take the form of a semi-conductor memory, a wired diode matrix, or other economical memory forms. It is termed a read-only memory since its contents are usually permanent although some form of alterable memory device could be employed to provide the function of the ROM 26.

At any instant the ROM 26 outputs an eight-bit signal representing the line number within the character matrix defined by the condition of the three least significant bits of the line counter 20. The character from which this line is drawn is determined by the status of the character code source 12. During the generation of the ten horizontal lines which define a vertical character space, the three least significant bits of the line counter output will assume the same value twice. This is illustrated in FIG. 1*b* which lists the binary states of the line counter as it counts from zero through nine. Note that three least significant bits of that output are identical for the binary numbers zero and eight and for the binary numbers one and nine. Accordingly, during the generation of the ten lines that define a character tow of the eight outputs of the ROM 26 will be repeated twice.

The seven bits of each line output from the ROM indicating the status of the seven dots across the width of the character matrix are provided to a parallel/serial converter 28. The converter also receives the outputs of the dot clock 14 and sequentially outputs the seven parallel bits that it receives from the ROM 26 to the cathode ray tube 10. These constitute the video or luminence signals and determine whether a dot is generated in any particular position on the tube face.

The eighth bit of each output from the ROM 26 is provided to a position logic circuit 30. This circuit also receives the most significant bit of the output from the line counter 20. Employing these two signals the position logic circuit 30 generates outputs during two of the ten line times defining a character height which clears the contents of the converter 28 so that the converter does not output the code received from the ROM 26 but rather outputs a train of zeros.

In the preferred embodiment of the invention the logic device 30 simply consists of an exclusive OR unit. When both of its inputs are either high or low the circuit outputs a low signal; when one of its inputs is high and the other low it outputs a high signal. Other forms of logic device could be employed to clear the parallel/serial converter as a function of the states of the position code bit outputted from the ROM and the line counter status.

In the preferred embodiment of the invention the position codes associated with each of the eight matrix lines for a character are such that the position logic 28 blanks out the generation of either the first two or the last two lines in each character height resulting in the display of either the last eight of the first eight lines outputted. In this manner each line is outputted once but the position of the eight-bit line matrix within the ten line space is controlled. The necessity of providing a position code bit with each line, rather than a single bit to control the entire character, derives from the fact that an entire character is not generated at a single time, but is rather interleaved with the generation of the balance of the characters in a row. If a single position bit outputted with the first line of the matrix were to be used to control the generation of the balance of the signal it would be necessary to store these signals for all of the characters being generated across a row. This technique may be used in alternative embodiments of the invention.

FIGS. 2*a* and 2*b* illustrate the generation process for the upper case letter "T" and the lower case letter "g" respectively. The letter "T" is positioned in the top eight lines of the matrix. These lines are sequentially generated during the first eight line scans of a row. During these lines the line counter content increases from binary 0 (0000) to binary 7 (0111). During the generation of the ninth line in the row the line counter's status is 1000 and since the ROM 26 only receives the last three bits, 000, it provides the same output as occurred during the first line scan of that row, a full series of ones. During the scan of the first line of the row, and in fact during the scan of the first 8 lines of the row, the position code digit provided to the position logic unit 28 is a one and the most significant bit of the line counter output is a zero. Accordingly the position logic circuit outputs ones during these first eight cycles. During the ninth and tenth lines the position code outputs are the same as those during the first two lines, that is ones, but the most significant bit output of the line counter is also a one. Accordingly the position logic output is a zero. These zeros act to clear the parallel/serial converter 20 so that it provides an all zero output. Accordingly the video output is determined by the first 7 bits of the first 8 output lines from the ROM during generation of this letter.

In the case of the lower case letter "g" illustrated in FIG. 2 the position code bits associated with the first two lines of the matrix are zeros. Since the most significant bit of the line counter is also a zero during the generation of the first two lines of the row the position logic unit outputs a zero during the first two lines and the counter is cleared during the first two lines. During the regeneration of these same two lines of the matrix by the ROM during the ninth and tenth scan lines the zero position codes combine with the one of the most significant bit to produce high outputs from the position logic unit allowing the two lines to be written. Accordingly, the lower case "g" occupies the bottom 8 lines of the ten line row height.

While the preferred embodiment employs a 7 × 8 matrix distributed within a 10 line high row, it should be apparent to one skilled in the art that in other embodiments of the invention the present concept may be employed to distribute any N lines of a matrix over a larger number M lines of the row in accordance with position control signals stored within the matrix.

The embodiments of the invention in which an exclusive property or privilege is claimed are defined as follows:

1. A character generating system for generating a plurality of rows of dot matrix characters on a video display device having a conventional television raster scan, each row having a height of M lines and a character width of X dots, comprising: a video display device; a source of signals representative of the character type to be instantaneously generated; a source of signals representative of the line being generated within each row; a memory operative to store N multi-digit binary line signals for each character type where N is less than M, each line signal comprising a dot matrix part consisting of X bits and a position code part, the memory being operative to receive the signals representative of the character type to be generated and M successive signals representative of the line within a row M−N of said M signals being repeated, and to output the line signal for that character and line, whereby M−N line signals are outputted a plurality of times receipt of said M successive line signals; and a logic circuit for receiving the position code portion of a line signal outputted from the memory and the signal representative of the line within a row being generated and operative to control the application of the dot matrix part of the line signal from the memory to the video device.

2. The character generating system of claim 1 wherein the position code parts of the N line signals for each character type are such as to cause the logic circuit to provide each of the N line signals to the video device once during each generation of the M lines forming a character height and to blank the video display during generation of M−N lines.

3. The character generating system of claim 1 further including a parallel to serial converter connected to the memory to receive the dot matrix part of each line signal outputted by the memory; a connection between the output of the parallel to serial converter and the video display; and a connection between said logic circuit and said converter which causes the contents of the converter to be cleared upon certain outputs occurring from the logic circuit.

4. The character generating system of claim 1 wherein the signal representative of the line being generated within the row comprises a binary signal and certain of the bits comprising said binary signal are connected to the memory and the remaining bits are connected to the logic circuit.

5. The character generating system of claim 4 wherein the most significant bit of the binary signal representing the line being generated within a row is provided to the logic circuit and the remaining bits are provided to the memory.

6. The character generating system of claim 5 wherein M is greater than $2^y$ and less than $2^{y+1}$ where y equals the number of bits of the binary signal representative of the line being generated within a row provided to the memory.

7. The character generating system of claim 6 wherein the binary signal representative of the line being generated within the row consists of a four-bit signal and M is greater than 8 and less than 16.

8. The character generating system of claim 1 wherein the position code part of each binary line signal consists of a single bit.

9. A system for providing video signals for a raster scan video display device to generate dot matrix characters having a row height of N lines within an M dot high field, M being greater than N, comprising: a source of binary signals coding the identity of a character to be instantaneously displayed; a line counter operative to generate M consecutive binary signals representative of a line within a row instantaneously being generated on the video display device, M−N of said binary signals being generated more than once; a matrix memory containing N groups of dot matrix lines for each character type, each dot matrix line consisting of a plurality of bits equal in number to the dot width of a character and a binary position signal, the memory being connected to receive the signal representative of a character type to be instantaneously generated and at least certain signals from said line counter and being operative to output a parallel dot matrix line; a parallel to serial converter operative to receive the dot bits of said character dot line and to sequentially provide the dot bits to the video display; and a logic circuit connected to the output of the line counter operative to receive the binary position signal from the outputted dot matrix line and to clear the parallel to serial converter during the generation of M−N lines in each character, whereby the placement of the character generated within the row height may be controlled.

10. The system for providing video signals of claim 9 wherein the highest order bit of the line counter signal is applied to the logic circuit and all the lower order bits are provided to the memory.

11. The system for providing video signals of claim 10 wherein N equals $2^x$ where x is the number of lower order bits of the line counter output provided to the memory and M is equal to or less than $2^{x+1}$.

12. A character generating system for generating a plurality of rows of dot matrix characters on a raster scan video display device, each row having a height of M lines, comprising: a memory operative to store M multi-digit binary line signals for each character type to be generated by the display where N is less than M, each line signal comprising a dot matrix part having a number of bits equal to the dot width of a character and a position code part; means for causing the memory to output a line signal representative of the line of a character to be instantaneously displayed; a circuit operative to receive the position code part of the line signal outputted by the memory and operative to control the application of the dot matrix part of such line signal to video device.

13. The character generating system of claim 11 including means for generating a multi-digit binary signal representative of the line being generated within each row, and for providing at least certain of the bits of such signal to the memory and at least certain of the bits to said circuit.

14. A system for providing video signals for a video display device to generate dot matrix characters having a row height of between 9 and 15 lines comprising: a source of binary signals coding the identity of a character to be instantaneously displayed; a line counter operative to generate a binary signal representative of the line within a row instantaneously being generated on the video display device; a matrix memory containing 8 or less groups of dot matrix lines for each character type, each dot matrix line consisting of a plurality of bits equal in number to the dot width of a character and a binary position signal, the memory being connected to receive the signal representative of a character type to be instantaneously generated and the three least significant output bits of the line counter and being operative to output a parallel dot matrix line; a parallel to serial converter operative to receive the dot bits of said character dot line and to sequentially provide the dot bits to the display device; and a logic circuit connected to receive the highest order bit output of the line counter and the binary position signal from the outputted dot matrix line and to clear the parallel to serial converter during the generation of a number of lines in each character equal to the difference between the number of lines in a row and the number of groups of dot matrix lines stored in the memory for each character, whereby the placement of the character generated within the row height may be controlled.

* * * * *